AUTOMATIC RECORD PLAYER

INVENTOR:
Gérard Hugel
BY Richards & Geier
ATTORNEYS

Feb. 21, 1961 G. HUGEL 2,972,482

AUTOMATIC RECORD PLAYER

Filed Jan. 27, 1958 4 Sheets-Sheet 2

INVENTOR:

Gérard Hugel

BY

Richards & Geier

ATTORNEYS

Feb. 21, 1961 G. HUGEL 2,972,482

AUTOMATIC RECORD PLAYER

Filed Jan. 27, 1958 4 Sheets-Sheet 3

INVENTOR:
Gérard Hugel
BY
Richards & Geier
ATTORNEYS

Feb. 21, 1961

G. HUGEL 2,972,482

AUTOMATIC RECORD PLAYER

Filed Jan. 27, 1958

4 Sheets-Sheet 4

INVENTOR:

Gérard Hugel

By

Richards & Geier

ATTORNEYS

United States Patent Office 2,972,482
Patented Feb. 21, 1961

2,972,482

AUTOMATIC RECORD PLAYER

Gérard Hugel, Mulhouse, France, assignor to Sofranic, Paris, France, a company of France Filed Jan. 27, 1958, Ser. No. 711,364
Claims priority, application France Jan. 31, 1957
8 Claims. (Cl. 274—10)

This invention relates to automatic record players.

An object of the present invention is the provision of a record player, the operation of which is fully automatic throughout a complete cycle, so that the record player starts playing as soon as a stack of records is put in place, it successively plays each record of the stack and is brought automatically to a standstill as soon as the playing of the last record has been completed.

Another object is the provision of an automatic record player having a simple yet thoroughly reliable novel mechanism for operating the arm carrying the pick-up unit and the record changer.

A further object of the present invention is the provision of an automatic record player having a single novel power drive of extremely simple design for operating both the turntable and the record changer, as well as the arm mechanism.

Yet another object of the present invention is the provision of an automatic record player having a novel electrical contact arrangement by means of which the apparatus is switched on automatically as soon as a stack of records is put in place.

Other objects of the present invention will become apparent in the course of the following specification.

In accomplishing the objects of the present invention, it was found desirable to provide an arm carrying the pick-up unit and supported upon the platen in such manner that the arm carry out movements in both horizontal and vertical planes. The automatic operation of the arm is preferably effected by a cam drum member which is operated by the same power drive which actuates the turntable by frictional engagement. This cam drum member is automatically put into gear with the said power drive at the end of each record when the needle reaches the last groove, whereupon the said cam drum member successively raises the pick-up unit out of said groove, swings back the pick-up arm towards the outer periphery of the turntable, brings the supporting means of the pick-up arm back into a position in which the pick-up unit may fall on the first groove of the next record and then is automatically put out of gear with the power drive after having resumed its original angular position in readiness for the next cycle. A device for consecutively feeding the records is operated by means connected with the arm actuating means, and includes contacts which automatically switch on the motor of the record player by the weight of the stacked records. Other contacts are provided to enable the record player to play the last record when the stack is exhausted, and to switch off the motor when the playing of the last record has been completed.

The invention will appear more clearly from the following detailed description when taken in connection with the accompanying drawings, showing by way of example a preferred embodiment of the inventive idea.

Figure 1:
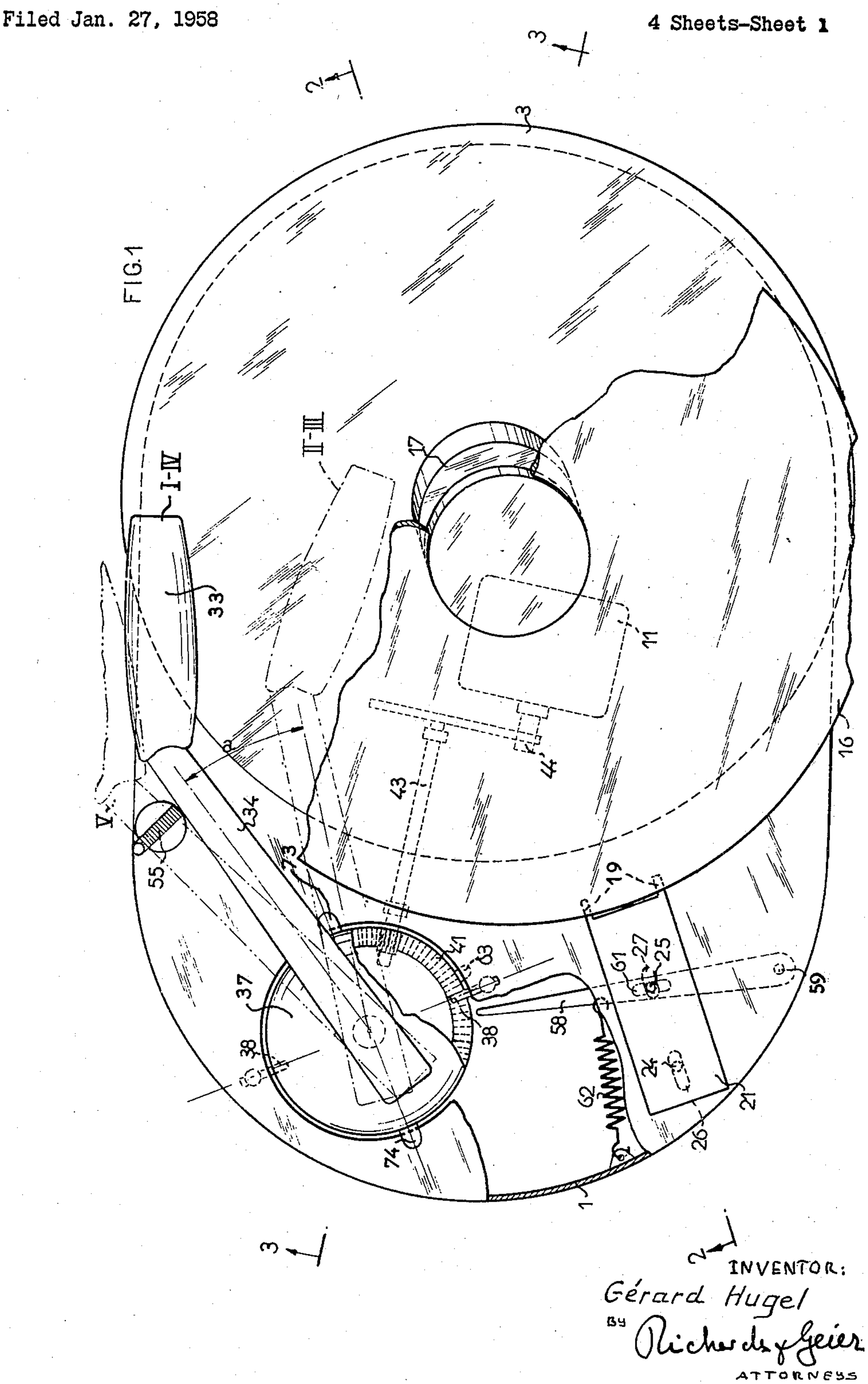
Figure 1 is a plan view of an automatic record player constructed in accordance with the principles of the present invention, some parts being shown as being broken off.

The automatic record player shown in the drawings includes a base 1, carrying a platen 2, which supports all the component parts of the apparatus. A turntable 4 is covered by a sheet 5 of suitable material, such as felt or plastic. The drawings show a record 3 which is supported upon the turntable 4 and which is being played.

The turntable 4 is provided with a hub 6 which is freely mounted upon a stationary spindle 7. The lower end of the spindle 7 is rigidly secured to the platen 2 by any suitable means.

Figures 2, 6:
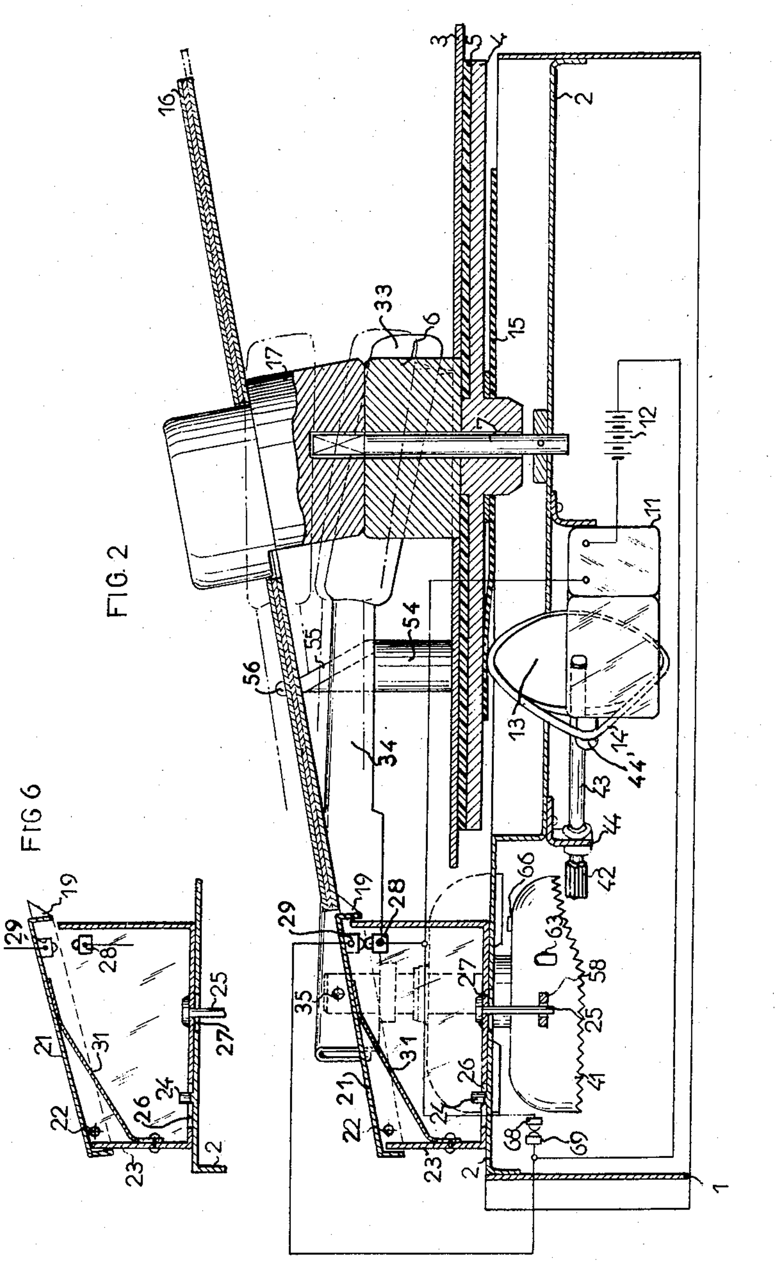
Figure 2 is a vertical section along the lines 2—2 of Figure 1.
Figure 6 is a vertical section through the record changing carriage provided with an automatic switch.

The turntable 4, which is freely mounted for rotation upon the spindle 7, is rotated by any suitable drive which in the embodiment illustrated consists of an electric motor 11 suspended from the platen 2 and provided with electrical current from a dry battery 12 located within the base 1 of the apparatus, as diagrammatically indicated in Figure 2. The motor 11 drives a pulley 44' which is connected with a pulley 13 by an endless belt 14. The purpose of the belt drive 14 will be explained in greater detail hereinafter.

A disc 15, which is preferably resilient, is secured to the hub of the turntable 4 and is located at a distance from the hub, so that a gap is provided between the upper face of the disc 15 and the lower face of the turntable 4. The pulley 13 with the belt 14 engages the under surface of the disc 15 and presses it against the turntable 4, so that the turntable 4 is rotated. Due to the provision of a gap between the disc 15 and the turntable 4, the disc 15 may move vertically to some extent and thus make up for any lack of true running or for the wobbling movement of the turntable 4. The disc 15 ensures that the pulley 13 is always kept in driving engagement with the turntable 4. The pulley 13 is keyed on a spindle 43 also carrying a pinion 42, the purpose of which will appear hereunder.

The upper end of the spindle 7 is rectangular or square in cross-section and is adapted to receive a similarly shaped bore hole provided in a stepped support 17. Due to this arrangement, the stepped support 17 will be correctly angularly positioned upon the hub 6. Figure 2 shows a reserve stack of records 16 which are carried by the stepped support 17.

The record changing device comprises a reciprocable carriage 23 which is connected with a cover-like member 21 by means of a horizontal spindle 22. The cover-like member 21 has one or more projections or projecting noses 19. As shown in Figure 2, the edge of the stack of the reserve records 16 rests upon a nose 19 so as to maintain the cover-like member 21 in a closed position.

The carriage 23 is mounted for reciprocation within slots 26 and 27, so that it moves backwards and forwards along the line extending through the centre of the turntable 4. The carriage 23 is guided in this reciprocal movement by two pins 24 and 25. The pin 24 is rigidly connected with the platen 2 and extends through a radial slot 26 which is provided in the bottom of the carriage 23. On the other hand, the pin 25 is rigidly connected with the carriage 23 and extends through a radial slot 27 which is formed in the platen 2. The reciprocal movement of the carriage 23 is effected through the pin 25 by a mechanism which will be described in detail hereinafter.

As shown in Figures 2 and 6, an electrical contact 28 is firmly mounted within the carriage 23. The contact 28 is adapted to cooperate with another electrical contact 29 carried by the cover 21. A leaf spring 31 is attached to an inner wall of the carriage 23 and presses against the cover 21, thereby urging the cover 21 upwardly to the raised position shown in Figure 6, in which the contacts 28 and 29 are disengaged. On the other hand, when the cover 21 is closed by the pressure of the records 16 against the nose 19, the contacts 28 and 29 are interengaged as shown in Figure 2. The leaf spring 31 is so selected that the pressure of at least one of the records 16 will maintain the cover 21 and, consequently, the contacts 28 and 29 in the closed position.

When the contacts 28 and 29 are closed, an electrical circuit is established, which includes the battery 12, the contacts 29 and 28, the electric motor 11 and back to the battery 12.

Figure 3:
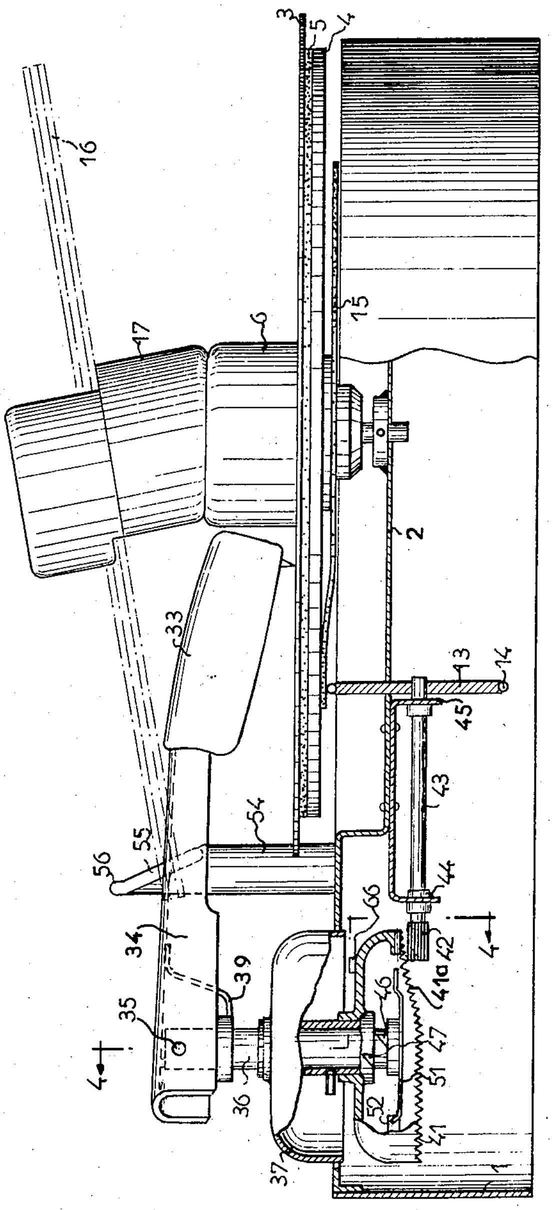
Figure 3 is a vertical section along the line 3—3 of Figure 1.

As best shown in Figure 3, the pick-up unit 33 which may be of standard construction, is carried upon one end of a swingable arm 34. The arm 34 is connected by a horizontal pin 35 to the upper end of a vertical shaft 36. The shaft 36 is rotatably mounted within an inner hub of a bell-shaped member 37. The bell-shaped member 37 is supported upon the platen 2 by means of diametrically disposed pins 38 (see Figures 1 and 4) which are attached to an under surface of the platen 2 and which extend through opposed openings provided in the bell-shaped member 37. The pins 38 extend in a horizontal direction substantially at right angles to the direction of the mean position of the pick-up carrying arm 34. The bell-shaped member 37 is provided with two abutments 73 and 74 respectively limiting its rocking motion and hence that of the shaft 36 to a first and a second angular positions. A supporting finger 39 rigidly secured to the shaft 36 is adapted to engage the under face of the arm 34. When the shaft 36 is in said first angular position, the pick-up unit 33 may rest freely on the record 3, but if the shaft 36 is tilted from said first to said second angular position, the pick-up unit is positively raised above the record by the finger 39. However the pick-up unit may be freely lifted without causing tilting of the shaft 36 or it may be further lifted once said tilting has been limited by the abutment 74.

The mechanism which provides for every movement of the arm 34 includes as its main part a cam drum member 41 which is freely mounted for rotational movement upon the hub of the bell-shaped member 37. The lower edge of the cam drum member 41 is provided with teeth, and has an arcuate or arched portion 41*a*. The cam drum member 41 is slidable along the hub of the bell-shaped member 37, this sliding being limited upwardly by an abutment 75. In this uppermost position, the cam drum member 41 does not bear on the tooth 46. The upwardly extending tooth 46 is carried by an enlarged flange portion of the lower end of the shaft 36.

The cam drum member 41 has a central hub, the under face of which is adapted to ride upon the tooth 46 and which is provided with a notch 47, corresponding in shape to the shape of the tooth 46. In the angular position of the cam drum member 41 shown in the drawing, even with the shaft 36 tilted in the above mentioned first angular position in which the pick-up unit 33 is free to rest on a record (record playing configuration) the teeth of the cam drum member 41 are maintained by the tooth 46 at a certain distance from the pinion 42 which rotates with the turntable 4.

When the tooth 46 registers with the notch 47 however, the cam drum member 41 drops into a lower position in which its teeth are brought into gear with the pinion 42. The cam drum member 41 is then rotated and, due to the arched shape of its toothing it is raised along the shaft 36, until it encounters the abutment 75. From this moment since it can no more slide upwardly, and since the point of its periphery which rests on the pinion 42 is further urged upwardly, the cam drum member 41 is tilted and rocks the shaft 36 together with the bell-shaped member 37 towards the above mentioned second angular position together with the shaft 36 which lifts the pick-up unit 33 clear of the grooves of the last played record. It goes without saying that the abutments 73, 74 are so disposed as to permit the cam drum member 41 to be accommodated (whatever its angular position) between the pinion 42 and the abutment 75.

Figures 4, 5:
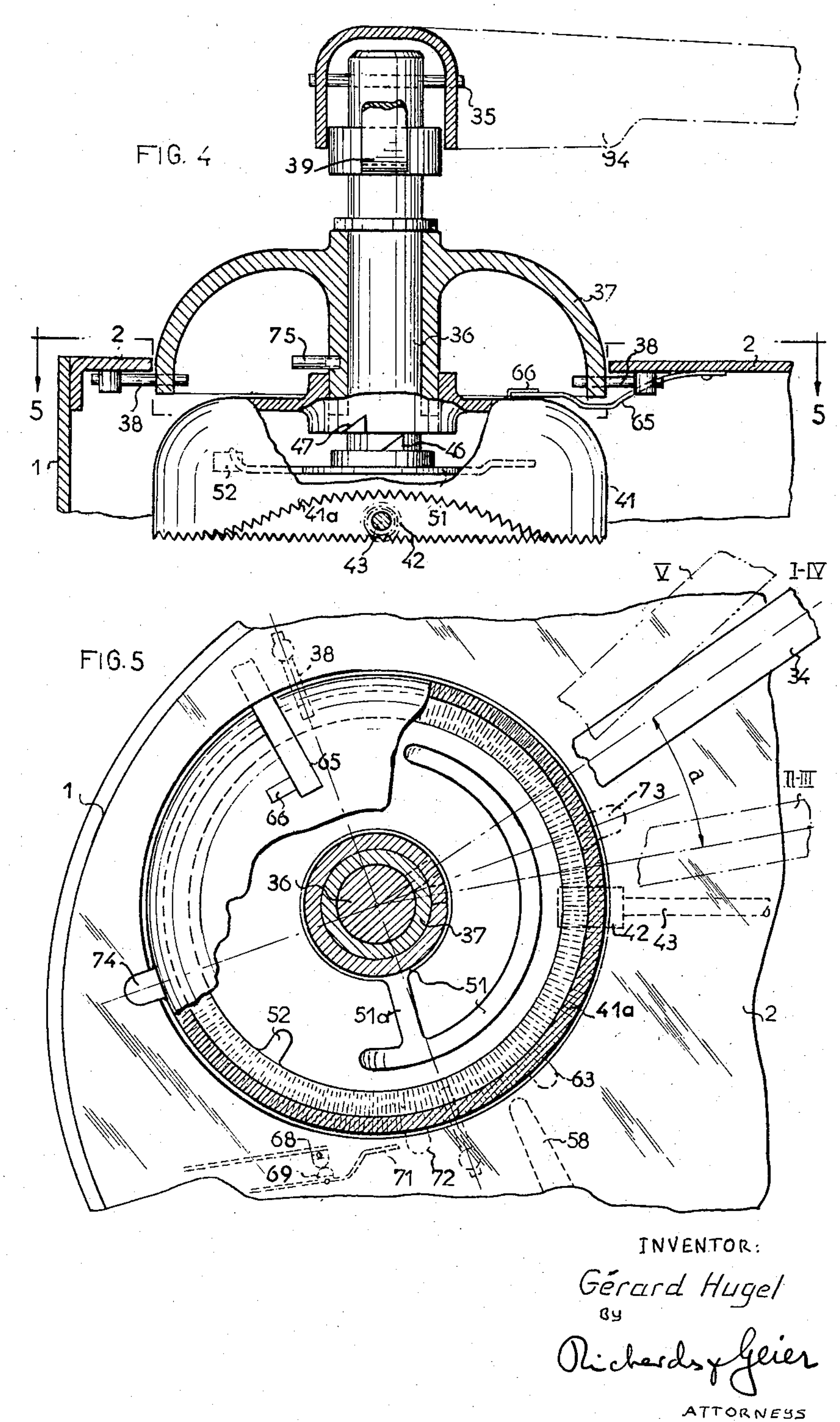
Figure 4 is a fragmentary vertical section along the line 4—4 of Figure 3 on an enlarged scale.
Figure 5 is a corresponding horizontal section along the line 5—5 of Figure 4.

It is to be noted that the pinion 42 rotates the cam drum member 41 anticlockwise (looking in the direction of Fig. 5). Now, as explained above this rotation begins when the tooth 46 is fully engaged in the notch 47. However, since the cam drum member is not directly mounted on the shaft 36, if the slope of the trailing edge of the tooth 46 is sufficiently soft with respect to that of the arched toothed portion 41*a*, it will be understood that during the rocking motion of the elements 41, 36, 37, 39 and 33, the rotation of the cam drum member 41 will not impart any angular displacement to the shaft 36 and, hence, to the pick-up unit 33, so that the latter will be lifted clear of the innermost groove of the record without any risk of scratching.

An arcuate leaf spring 51, best shown in Figures 4 and 5, is located within the cam drum member 41, and is secured to the lower end of the shaft 36 by an intermediate radial portion 51*a*. The purpose of the leaf spring 51 is to ensure a connection in the rotational direction between the cam drum member 41 and the pick-up carrying arm 34. As shown in Figure 5, the end portions of the arcuate spring 51 are unsupported. The spring 51 may be engaged by a boss 52 carried upon an inner wall of the cam drum member 41, so as to form therewith a torque limiting connection. This connection takes place in that when the boss 52 will engage the leading end of the spring 51, and when the resisting effort provided by the arm 34 is moderate, the boss 52 of the rotating cam drum member 41 will be able to push the end of the arcuate spring 51 along with it, provided that these parts are in the position shown in Figure 4. Then the spring 51 and the shaft 36 connected therewith will be rotated along with the boss 52, thus swinging the arm 34 towards the outer periphery of the plate 4. On the othere hand, if the arm 34 encounters a substantial resistance, as will be explained in greater detail hereinafter, the boss 52 will not push any more the spring 51, but will slide under the spring 51 and will move along the lower face of the spring 51 until it passes the opposite end of the spring, the spring 51 being forced somewhat upwardly by the boss 52 during this sliding movement. Once the cam drum member 41 has been sufficiently rotated to be lifted into its upper position and tilted to raise the pick-up unit 33 as described above, the boss 52 engages the leading end of the spring 51 and from this moment the rotating cam drum member 41 drives the shaft 36, and the pick-up arm 34 counter-clockwise, thus bringing the pick-up unit 33 back towards the outer edge of the turntable 4.

As shown in Figures 1, 2 and 3, the platen 2 carries a vertical column 54 which is located at a distance from the axis of the turntable, which is substantially equal to one-half of the diameter of the records. Thus, the column 54 is so located that when the arm 34 is in engagement with the inner face of the column 54, the needle of the pick-up head 33 is located just above the first groove of a record 3 placed upon the turntable 4. The top portion of the column 54 has an incline 55, which is directed upwardly and outwardly and which terminates in a tip portion 56. The arrangement is such that when the arm 34 bears against the tip portion 56, it clears the path of the records 16, dropping from the support 17 upon the turntable 4.

The tip portion 56, then opposes a strong resistance to any further rotation of the shaft 36, the boss 52 therefore will force the arcuate spring 51 upwardly and will slide along the under face of the spring 51 and then leave it.

When the arched portion 41*a* of the cam drum member 41 reaches the driving pinion 42, the cam drum member 41, along with the bell-shaped member 37, the shaft 36 and the arm 34, rocks back about the pins 38 to record playing configuration. Once the abutment 73 rests on the platen 2, the cam drum member 41 slides downwardly until it bears on the tooth 46. As the top of the arched toothed portion 41*a* comes into registration with the pinion 42, the cam drum member 41 is put out of gear with the said pinion and the initial conditions are re-established.

As already stated, the dropping of the records 16 upon the turntable is effected by the reciprocating movement of the carriage 23. For the purpose, a rod 58 is mounted by a pivot 59 upon the under surface of the platen 2, and is provided with an elongated slot 61 which receives the pin 25, rigidly connected with the carriage 23. The rod 58 is connected intermediate its ends with a restoring spring 62, the opposite end of which is attached to the frame 1. The spring 62 urges the rod 58 away from the axis of the turntable 4. The free end of the rod 58 may be engaged by a boss 63 provided upon the outer cylindrical face of the cam drum member 41. Due to this arrangement, the boss 63 may push the free end of the rod 58 temporarily toward the axis of the turntable 4.

In order to prevent the cam drum member 41 from being slowly pivoted backward by frictional engagement with the shaft 36 as a record is being played, provision is made for a leaf spring 65 (Fig. 4), which is adapted to cooperate with a stud 66 upon the upper face of the cam drum member 41. The stud 66 is inclined toward the rotational direction of the cam drum member 41 and is steep in the opposite direction.

Finally, the record player of the present invention includes a device for the playing of the last record. This device comprises a pair of contacts 68 and 69; best shown in Figure 2. The contact 68 is a stationary contact which is carried by the platen 2. The contact 69 is carried by a flexible leaf spring 71 (Fig. 5), which is adapted to be engaged by a boss 72 carried upon the outer surface of the cam drum member 41, close to the completion of the cyclic rotational movement of the cam drum member 41 in order to separate the contacts 68 and 69.

It is apparent from the above that the electric motor 11 drives the turntable 4 through the belt drive and the pulley 13 acting as a friction wheel. Furthermore, the electric motor 11 provides for all the movements of the pick-up arm 34 and for the changing of the records. Thus, the apparatus is automatically set in motion from the moment a stack of records 16 is placed upon the support 17. The apparatus stops automatically upon the completion of the playing of the last record.

The operation of the apparatus during one complete cycle is as follows:

The user places a record 3 upon the turntable 4 while the pick-up arm is in the position I (Fig. 1) with the needle in the first groove of the record 3. The user places a stack of records 16 upon the central support 17. The edge of the records 16 will bear against the nose 19 of the cover 21, so that the electrical contacts 28 and 29 will be closed. Thus, the electrical circuit will be closed, which includes the contacts 28 and 29, the motor 11 and the battery 12, so that the motor 11 will be actuated and will rotate the turntable 4 by means of the pulley 13, the endless belt 14 and the disc 15. At that time, the hub of the cam drum member 41 rests on top of the tooth 46 of the shaft 36, so that the cam drum member 41 is in an upper position in which its toothed edge is out of engagement with the pinion 42.

The record 3 will be played, and as it is being played the pick-up unit 33 will move progressively toward the centre of the record by the action of the spiral groove of the record in which the needle is engaged. The arm 34 and the shaft 36 will be slowly turned in the course of this movement, the shaft 36 being rotated clockwise (looking in the direction of Fig. 5). At that time, the cam drum member 41 will be prevented from rotation by the stud 66 which abuts the leaf spring 65. Consequently, in this position the pinion 42 will rotate idly, being driven by the motor 11 through the pulleys 44′ and 13, and the shaft 43. This is the position illustrated in the drawings.

When the playing of the record is completed, the arm 34 will reach the position II (Fig. 1), and at that time the shaft 36 will be turned to such an extent that its tooth 46 will be located directly below the notch 47 of the cam drum member 41. Then the cam drum member 41 will drop downwardly and the tooth 46 will move into the recess 47. Consequently, the toothed edge of the cam drum member 41 will move into engagement with the pinion 42, and the cam drum member 41 will be rotated by the pinion 42. The pinion 42 will carry out a rolling movement upon the sloping edge 41*a* of the cam drum member 41, and, therefore, the cam drum member 41 will not only rotate counter-clockwise, but will also rock the bell-shaped member 37 about the pins 38, as described above. This rocking movement will be transmitted to the shaft 36 and will raise the arm 34 to the position III above the last groove of the record 3. As soon as the boss 52 engages the corresponding end of the arcuate spring 51, it pushes it along, thus rotating the shaft 36 and swinging the arm 34 secured thereon towards the outer periphery of the record.

In the course of this swinging movement, the arm 34 engages the column 54 at a level corresponding to that of the incline 55, and then the arm is forced to climb up the incline, so that it will clear the area of the records. In the position V (Fig. 5), the arm abuts against the tip 56 of the column 54. Then, as described above, the boss 52 will force the arcuate spring 51 upwardly and will slide along the under face of the spring 51. During this sliding movement the arm 34 will remain stationary on the top 56 of the column 54, while the cam drum member 41 continues to rotate. In the meantime, the boss 63 of the cam drum member 41 will engage the rod 58 and will swing it about its pivot 59, thereby extending the spring 62 (Fig. 1). Since the pin 25 of the carriage 23 is located within the slot 61 of the arm 58, the arm 58 will push forward the carriage 23 in the direction toward the axis of the turntable 4. As already stated, the carriage 23 serves as a record distributor, and in the course of its forward movement the edge of the cover 21 located directly above the nose 19 will push forwardly the lowermost record of the stack of records 16, so that this lowermost record will drop upon the record 3 on the turntable 4. The boss 52 in the course of the rotation of the cam drum member 41 will approach the trailing end of the arcuate spring 51, so that the frictional force exerted by the spring 51 against the boss 52 progressively decreases. At a predetermined moment, this force is overcome by the force of gravity exerted upon the arm 34, which still rests upon the top 56 of the column 54. Then, under the action of this force of gravity, the arm 34 will slide downwardly upon the slope 55, and will finally move downwardly along the inner face of the column 54. At that moment, the arched portion 41*a* of the cam drum member 41 reaches the driving pinion 42, and the cam drum member 41, the bell-shaped member 37, the shaft 36, and the arm 34, will rock back about the pins 38. Simultaneously, the cam drum member 41 will slide downwardly axially until its hub comes to rest upon the tooth 46. At this moment, the cam drum member 41 is again disengaged from the driving pinion 42. The pick-up unit 33 is now again in the operating position with its needle engaged in the first groove of the second record. The cycle is completed.

It should be noted that once the boss 63 has pushed and passed the end of the rod 58, which operates the record distributor, the rod 58 along with the carriage 23 are restored to their original positions by the spring 62.

The apparatus will now play the second record, and the cycle is repeatedly and automatically carried out until the last record is played.

At the moment when the last record of the stack of records 16 is dropped upon the turntable 4, the spring 31 will move upwardly the cover 21, so that the contact 29 will move away from the contact 28 to the position shown in Figure 6. However, the electric motor 11 will remain energized, since the contacts 68 and 69 are closed, so that the playing of the last record will continue. When the playing of the last record is terminated, the cam drum member 41 will again begin to rotate, and at that moment when its revolution is nearly completed, the boss 72 will move the contact 69 away from the contact 68. Then the electrical circuit will be interrupted and the motor 11 will stop.

The motor 11 will be again actuated upon the closing of the contacts 28 and 29 when a new record is placed upon the support 17 and the nose 19 of the carriage 23. If a record is placed by hand directly upon the turntable 4, the user will be able to start the motor 11 by pressing downwardly upon the cover 21, so as to close temporarily the contacts 28 and 29 and thus initiate a new cycle.

It is apparent that the example shown above has been given solely by way of illustration and not by way of limitation, and that it is subject to many variations and modifications within the scope of the present invention. All such variations and modifications are to be included within the scope of the present invention.

What is claimed is:

1. In an automatic record player having a platen, a turntable rotatably mounted upon said platen, a pick-up unit for engaging a record upon said turntable, an arm having one end carrying said pick-up unit, a shaft, supporting means for mounting said shaft rotatably and tiltably on said platen, and means to articulate the other end of said arm on said shaft, so that the latter is capable, when tilted from a first to a second angular position, of lifting said pick-up unit clear off a record upon said turntable and, when rotated, of swinging said arm in a horizontal plane from an inner position to an outer position; a gear drive, a cam drum member rotatably and slidably mounted on said shaft supporting means, said cam drum member having a toothed edge, said toothed edge having an arched portion and an adjacent straight portion, spacer means located between said shaft and said cam drum member and movable by gravity from an operative position in which the toothed edge of said cam drum member is out of engagement with said gear drive to an inoperative position in which said cam drum member is driven by said gear drive when said arm is in its inner position and said gear drive is adjacent said arched portion, the shape of said toothed edge being such that during one revolution of said cam drum member in a direction corresponding to outwards horizontal swinging of said arm, said shaft will be successively tilted from said first to said second angular position, maintained in said second angular position for an angle of rotation equal to an angular stroke of said pick-up unit corresponding at least to the effective width of the recording on said record and then tilted from said second to said first angular position, said spacer means being movable from said inoperative position to said operative position by relative motion between said shaft and said cam drum member and means to rotatively connect said cam drum member with said arm at each turn of said cam drum member substantially as long as said shaft is in said second angular position.

2. In an automatic record player having a platen, a turntable rotatably mounted upon said platen, a pick-up unit for engaging a record upon said turntable, an arm having one end carrying said pick-up unit, and a vertical shaft having an upper end supporting the other end of said arm for a swinging movement of said arm in a horizontal plane; a device for moving the pick-up unit carrying arm relatively to the turntable, said device comprising a bell-shaped member, said shaft being rotatably mounted in said bell-shaped member, opposed pins carried by said platen and supporting said bell-shaped member for a swingable movement in a vertical plane, said pins extending substantially perpendicularly to the mean position of said arm, whereby said arm is raised and lowered relatively to the turntable, a cam drum member slidable relatively to said shaft; said shaft and said cam drum member having interengageable means movable by gravity from an inoperative position to an operative position in which said shaft and said cam drum member are operatively interengaged, said operative position corresponding to a predetermined position of said shaft at the end of the playing of a record, said cam drum member having a toothed edge, said toothed edge having an arched portion and an adjacent straight portion, and a gear device adjacent said toothed edge, said toothed edge being out of engagement with said gear drive in said inoperative position, said arched portion being engaged by said gear drive and said shaft being in a position corresponding to the end of the playing of a record when said interengageable means are moved to said operative position, whereby said cam drum member is rotated by one revolution, the shape of said toothed edge being such that during said one revolution said shaft and said pick-up unit are tilted to a raised position, said pick-up unit is then swung horizontally to the beginning of a record and then said pick-up unit is lowered to a record playing position, said interengageable means being movable from said operative position to said inoperative position by relative motion between said shaft and said cam drum member, and means operatively interconnecting said cam drum member and said bell-shaped member during the movement from the position corresponding to the end of the playing of a record to the record playing position.

3. A device in accordance with claim 2, comprising a pivot extending through the upper end of said shaft, said shaft having a flange supporting an edge of said arm.

4. In an automatic record player having a platen, a turntable rotatably mounted upon said platen, a pick-up unit for engaging a record upon said turntable, a shaft having an upper end supporting the other end of said arm for a swinging movement of said arm in a horizontal plane; a device for moving the pick-up unit carrying arm relatively to the turntable, said device comprising a bell-shaped member having a hub, said shaft being rotatably mounted in the hub of said bell-shaped member, means connected with said bell-shaped member and said platen for supporting said bell-shaped member for a swingable movement in a vertical plane, whereby said arm is raised and lowered relatively to the turntable, a cam drum member mounted on the hub of said bell-shaped member for rotational and axial movements and having a notch, a tooth carried upon the lower end of said shaft and adapted to engage said notch in a predetermined position of said shaft corresponding to the end of the playing of a record, said cam drum member having a toothed edge, said toothed edge having an arched portion and an adjacent straight portion, a pinion engaging said arched portion in said predetermined position, means driving said pinion, whereby said cam drum member is rotated by one revolution, the shape of said toothed edge being such that during said one revolution said shaft and said pick-up unit are tilted to a raised position substantially in said predetermined position of the shaft, said pick-up unit is then swung horizontally to the position corresponding to the beginning of the playing of a record, and then said shaft and said pick-up unit are tilted to a lowered position, said tooth having a surface inclined in the direction of rotation of said cam drum member, whereby said tooth is moved out of engagement with said notch by relative motion between said shaft and said cam drum member, and means operatively interconnecting said cam drum member and said bell-shaped member during the movement from said predetermined position to the position corresponding to the beginning of record playing.

5. In an automatic record player having a platen, a turntable rotatably mounted upon said platen, a motor suspended from said platen, a pulley driven by said motor, a driving member rotatably suspended from said platen, another pulley rotatable along with said driving member, an endless belt carried by said pulleys and frictionally engaging said turntable for rotating the turntable, a pick-up unit for engaging a record upon said turntable, an arm having one end carrying said pick-up unit, and a vertical shaft supporting the other end of said arm for a swinging movement of said arm in a horizontal plane; a device for moving the pick-up unit carrying arm relatively to the turntable, said device comprising means connected with said shaft and said platen for supporting said shaft for a swingable movement in a vertical plane, whereby said arm is raised and lowered relatively to the turntable, a cam drum member slidable relatively to said shaft; said shaft and said cam drum member having interengageable means movable by gravity from an inoperative position to an operative position in which said shaft and said cam drum member are operatively interengaged, said operative position corresponding to a predetermined position of said shaft at the end of the playing of a record, said cam drum member having a toothed edge, said toothed edge having an arched portion and an adjacent straight portion, a pinion carried by said driving member, said toothed edge being out of engagement with said pinion in said inoperative position, said arched portion being engaged by said pinion and said shaft being in said predetermined position when said interengageable means are moved to said operative position, whereby said cam drum member is rotated by one revolution, the shape of said toothed edge being such that during said one revolution said shaft and said pick-up unit are tilted to a raised position, said pick-up unit is then swung horizontally to the beginning of a record and then said pick-up unit is lowered to a record playing position, said interengageable means being movable from said operative position to said inoperative position by relative motion between said shaft and said cam drum member, and means operatively interconnecting said cam drum member and said bell-shaped member during the movement from said predetermined position to the record playing position.

6. In an automatic record player having a platen, a turntable rotatably mounted upon said platen, a pick-up unit for engaging a record upon said turntable, an arm having one end carrying said pick-up unit, and a vertical shaft having an upper end supporting the other end of said arm for a swinging movement of said arm in a horizontal plane; a device for moving the pick-up unit carrying arm relatively to the turntable, said device comprising a bell-shaped member having a hub, said shaft being rotatably mounted in the hub of said bell-shaped member, means connected with said bell-shaped member and said platen for supporting said bell-shaped member for a swingable movement in a vertical plane, whereby said arm is raised and lowered relatively to the turntable, a cam drum member mounted on the hub of said bell-shaped member for rotational and axial movements and having a notch, a tooth carried upon the lower end of said shaft and adapted to engage said notch in a predetermined position of shaft corresponding to the end of the playing of a record, said cam drum member having a toothed edge, said toothed edge having an arched portion and a straight portion, a pinion engaging said arched portion when said tooth is in engagement with said notch in said predetermined position, means driving said pinion, whereby said cam drum member is rotated by one revolution, the shape of said toothed edge being such that during said one revolution said shaft and said pick-up unit are tilted to a raised position substantially in said predetermined position of the shaft, said arm is then swung horizontally to the position corresponding to the beginning of the playing of a record, and then said shaft is tilted to a lowered position, means carried by said platen for preventing further swinging of said arm in said position corresponding to the beginning of the playing of a record, said tooth having a surface inclined in the direction of rotation of said cam drum member, whereby said tooth is moved out of engagement with said notch by relative movement between said shaft and said cam drum member, an arcuate spring extending parallel to a portion of the circumference of said cam drum member, means connected with said arcuate spring and said shaft for supporting said arcuate spring within said cam drum member, and a boss carried by said cam drum member and adapted to engage said arcuate spring to cause said shaft to rotate with said cam drum member and thereby cause said horizontal swinging of said arm while said arm is free to rotate, said boss sliding under said arcuate spring when said arm is prevented from rotating.

7. An automatic record player, comprising, in combination, a platen, a turntable rotatably mounted upon said platen, a pick-up unit for engaging a record upon said turntable, an arm having one end carrying said pick-up unit, a shaft supporting the other end of said arm for a swinging movement of said arm in a horizontal plane; a motor, means connected with said motor and frictionally engaging said turntable for rotating the turntable, means connected with said shaft and said platen for supporting said shaft for a swingable movement in a vertical plane, whereby said arm is raised and lowered relatively to the turntable, a cam drum member slidable and rotatable relatively to said shaft; said shaft and said cam drum member having interengageable means movable by gravity from an inoperative position to an operative position in which said shaft and said cam drum member are operatively interengaged, said operative position corresponding to a predetermined position of said shaft at the end of the playing of a record, said cam drum member having a toothed edge, said toothed edge having an arched portion and an adjacent straight portion, a pinion connected with the first-mentioned means, said toothed edge being out of engagement with said pinion in said inoperative position, said arched portion being engaged by said pinion and said shaft being in said predetermined position when said interengageable means are moved to said operative position, whereby said cam drum member is rotated by one revolution, the shape of said toothed edge being such that during said one revolution said shaft and said pick-up unit are tilted to a raised position, said pick-up unit is then swung horizontally to the beginning of a record and then said pick-up unit is lowered to a record playing position, said interengageable means being movable from said operative position to said inoperative position by relative motion between said shaft and said cam drum member, means operatively interconnecting said cam drum member and the second-mentioned means during the movement from said predetermined position to the record playing position, means connected with said turntable for supporting a reserve stack of records, a carriage mounted upon said platen for limited reciprocable movement to push one of the records from said reserve stack upon said turntable, a pin carried by said carriage, a rod pivotally connected with said platen and embracing said pin, a restoring spring connected with said rod, and a boss carried by said cam drum member and adapted to engage said rod for actuating said carriage.

8. In a phonograph having a supporting frame comprising a top wall, a turntable rotatably mounted thereon, a motor driving said turntable, a sleeve extending through an aperture formed in said top wall and pivotally connected to said top wall for tilting motion in a vertical plane extending substantially through the axis of said turntable, a shaft rotatably supported by said sleeve and having opposite end portions extending beyond said sleeve, a tone arm pivotally connected to the upper end of said shaft for horizontal and vertical swinging motion, a support for said tone arm connected to said shaft and preventing downward movement of said tone arm beyond a substantially horizontal position, stop means mounted on said top wall and preventing outward movement of said tone arm beyond an outermost inoperative position thereof, a drum member having a cylindrical hub portion and an annular toothed rim, said rim having an arched portion, said hub portion being mounted to rotate on said sleeve and to slide thereon along a limited path, spacer means interposed between the lower end of said shaft and the lower end surface of said hub portion to retain said hub portion against gravity in an inoperative position intermediate the upper and lower limits of said path, means rendering said space means inoperative in a predetermined relative position of said shaft and said hub portion to permit said hub portion to descend by gravity towards the lower limit of said path, in which predetermined position said tone arm is in a play-terminating position, a pinion driven by said motor and positioned in said supporting frame to engage the uppermost teeth of said arched portion of the toothed rim of the drum member as said hub portion moves towards said lower limit and drive the other teeth of said arched portion successively in meshing relation with said pinion, said drive helically raising said hub portion towards said upper limit of its path and subsequently tilting said hub portion, and consequently said shaft, into an inclined position to swing said tone arm vertically from said horizontal position thereof, and cooperating clutch elements for establishing a driving connection between said drum member and said shaft when said hub portion is in said inclined position, one of said clutch elements including yieldable means permitting yielding of the pressure of engagement between said clutch elements when said tone arm contacts said stop means upon further rotation of said drum member by said pinion.

References Cited in the file of this patent

UNITED STATES PATENTS 2,611,619 Cambron et al. ________ Sept. 23, 1952

FOREIGN PATENTS 638,483 Great Britain ___________ June 7, 1950
T9,071 Germany ______________ Aug. 16, 1956
F15,876 Germany ______________ July 12, 1956